Nov. 13, 1951 H. G. TRAVER 2,575,321

ROTARY HOE DISK

Filed July 26, 1946

INVENTOR.
H. G. Traver
BY John A Seifert
ATTORNEY.

Patented Nov. 13, 1951 2,575,321

UNITED STATES PATENT OFFICE 2,575,321

ROTARY HOE DISK

Harry G. Traver, Cranford, N. J.

Application July 26, 1946, Serial No. 686,273

5 Claims. (Cl. 97—217)

This invention relates to rotary hoes consisting of disks having forks extending radially from the periphery thereof and rotatably mounted on a shaft in spaced relation to each other.

It has been the practice to make the disks and forks of separate parts and securing the parts together by suitable means, such as rivets, the forks being elongated angle members tapering in an arcuate direction to a point at one end and the opposite end portion straight and secured to the disk by rivets engaged in a side portion of the angle and the disk. Alternate fork members are secured to the opposite faces of the disk.

It is an object of the invention to make the disks and forks in one piece and by one stamping operation.

It is another object of the invention to form radially extending ribs of channel shape in cross section in the disk with adjacent ribs projecting from the opposite faces of the disk and extending predetermined ribs projecting from the opposite faces of the disk into the forks to form the forks of channel shape in cross section simultaneously with the stamping of the disk and forks.

It is a further object of the invention to form the forks with front and rear arcuate edges tapering to a point with the bottom of the channel of the forks terminating at the front edge inwardly of the point and the forks bent laterally from the face of the disk from which the extended ribs project simultaneously with the stamping of the disk and forks and the forming of the ribs in the disks.

Another object of the invention is to form the disk with a center opening and an annular flange extending from one face of the disk simultaneously with the stamping of the disk and forks and subsequently engaging a tubular member in said opening and flange and securing the tubular member to the disk and flange to form a hub portion.

A further object of the invention is to bevel the frone edge of the forks to form a cutting edge.

Other objects and advantages of the invention will be described hereinafter.

In the drawing accompanying and forming a part of this application, Figure 1 is a side elevational view of my improved rotary hoe.

The embodiment of the invention as shown in the accompanying drawing comprises a disk 7 having an opening in the center thereof and an annular flange 8 formed of the material stamped from the disk to form said opening and extending from one face of the disk. A tubular member 9 is engaged in the center opening and the flange 8 with the opposite end portions of the tubular member projecting from the opposite faces of the disk and the tubular member is secured in said position by suitable means, such as solder or a weld, applied to the adjoining portions of the tubular member and the disk and flange, as shown at 10 in Figure 2. The tubular member 9 constitutes a hub of the disk for rotatably mounting the disk on a shaft, not shown.

Figure 3:
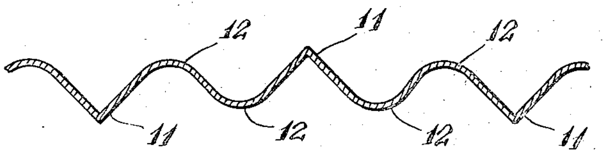
Figure 3 is an arcuate cross sectional view taken substantially on the line 3—3 of Figure 1 looking in the direction of the arrows to show the ribs in an intermediate portion of the disk.
Figure 4:
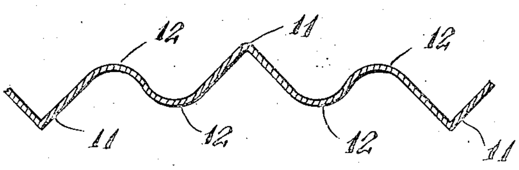
Figure 4 is a view similar to Figure 3 taken on the line 4—4 of Figure 1 to show the ribs adjacent to the periphery of the disk.

The disk is arranged with a series of ribs of channel shape in cross section extending radially from the flange 8 to the periphery of the disk with the adjacent ribs extending from the opposite faces of the disk. As shown in Figures 3 and 4, every fourth rib 11 extending from the opposite faces of the disk is of V shape in cross section, and the two intervening ribs 12 extending from the opposite faces of the disk are of arcuate shape in cross section.

Figure 1:
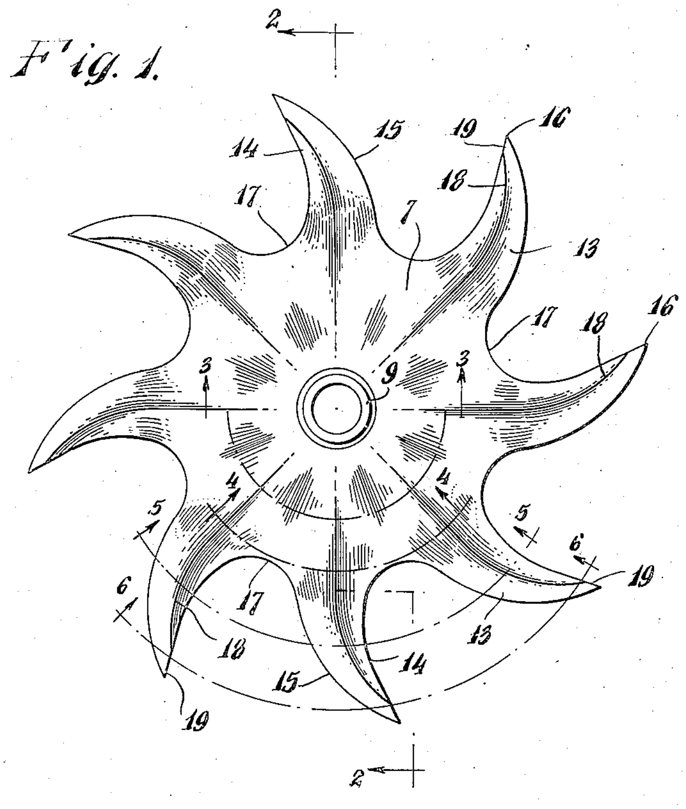
Figure 2:
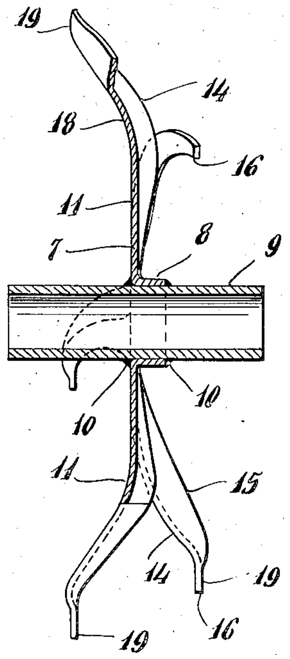
Figure 2 is a sectional view taken on the line 2—2 of Figure 1 looking in the direction of the arrows.

There are provided integral with and extending from the periphery of the disk a series of forks 13 having a concave arcuate front edge 14 and a convex arcuate rear edge 15 extending in an arc having a greater radius than the front edge so that the two edges merge into a point, as at 16. The rear edge 15 of a fork 13 and the front edge 14 of the succeeding fork 13 merge in an arcuate edge 17 at the periphery of the disk 7, as shown in Figure 1. To impart greater soil working effectiveness to the forks 13, they are formed to channel shape in cross section by extending the ribs 11 of the disk 7 into said forks in an arcuate direction corresponding to the curvature of the rear edge 15 so that the V-shaped bottom of the channel of the forks terminates at the front edge 14 at a point inwardly of the point 16, as indicated at 18 in Figure 1, to form a straight portion 19, as shown in Figures 1 and 2. To further the soil working effectiveness of the forks, alternate forks are bent or curved laterally from the opposite faces of the disk 7 by bending said forks in an arcuate direction from the face of the disk from which the ribs 11 project, as shown in Figure 2, so that the forks are bent with the V bottom of the channel in the forks on the concave side of the curve and the open face of said channel on the convex side of said curve. The bending of the alternate forks laterally in opposite directions positions the straight portions 19 to extend in opposite oblique directions, as shown in Figure 6.

The ribs 11 and 12 in the disks reinforce said disk and also provide soil working surfaces on the disk.

Figure 5:
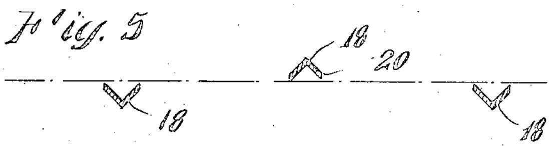
Figure 5 is an arcuate cross sectional view taken on the line 5—5 of Figure 1 looking in the direction of the arrows to show the channel shape of the portion of the forks adjacent to the disk.
Figure 6:
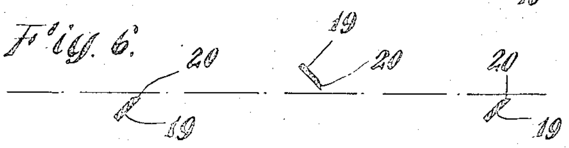
Figure 6 is a view similar to Figure 5 taken on the line 6—6 of Figure 1 looking in the direction of the arrows to show the flat or straight shape of the pointed end of the forks.

To facilitate the entering of the forks into the ground and cutting of the soil, the front edges 14 of the forks are formed to a cutting edge as by beveling said edge, as shown at 20 in Figures 5 and 6.

As shown in Figures 5 and 6, the depth of the ribs 12 is progressively decreased outwardly from the flange, so that said ribs are more shallow at the periphery of the disk than at an intermediate portion of the disk.

A rotary hoe disk as described may readily be produced from sheet metal by a single stamping operation wherein the disk 7 is formed with the flange 8 and ribs 11 and 12 simultaneously with the forming of the forks 13 with the arcuate edges 14 and 15 and the channel 18 and the lateral bending of the forks alternately from the opposite faces of the disk. Subsequently to the forming of the disk and forks, the tubular member 9 is engaged in and secured to the flange 8 and the disk 7.

Having thus described my invention, I claim:

1. A rotary hoe comprising a disk arranged with radially extending ribs and adjacent ribs projecting from opposite faces of the disk, and forks integral with and extending radially from the periphery of the disk and having the portion adjacent to the periphery of the disk of channel shape in cross section merging with and corresponding to the cross sectional shape of certain of said ribs projecting from the opposite faces of the disk whereby the ribs of adjacent forks extend in opposite directions.

2. In a rotary hoe, a disk arranged with radially extending ribs of channel shape in cross section with adjacent ribs projecting from opposite faces of the disk and certain of said ribs projecting from the opposite faces of the disk being of V shape in cross section, and forks integral with and extending from the periphery of the disk in alinement with the V-shaped ribs and having a cross sectional shape corresponding to and merging with said V-shaped ribs.

3. A rotary hoe comprising a disk arranged with radially extending ribs of channel shape in cross section with alternate ribs projecting from the opposite faces of the disk, and forks integral with and extending from the periphery of the disk in alinement with certain of said ribs projecting from the opposite faces of the disk and of channel shape in cross section corresponding to the cross sectional shape of the alined ribs, and alternate forks extending laterally from the face of the disk from which the alined ribs project.

4. A rotary hoe comprising a disk arranged with radially extending ribs of channel shape in cross section with alternate ribs projecting from the opposite faces of the disk, and forks integral with and extending from the periphery of the disk in alinement with certain of said ribs projecting from the opposite faces of the disk and of channel shape in cross section corresponding to the cross sectional shape of the alined ribs, and the forks having a front concave edge and a rear convex edge tapering to a point and the bottom of the channel of the forks extending in an arc corresponding to the arc of the rear edge and terminating at the front edge inwardly of the point of the forks.

5. A rotary hoe as claimed in claim 4, wherein the portion of the forks between the termination of the bottom of the channel of the forks at the front edge of the forks and the point of the forks extend in a straight plane, and the alternate forks bent laterally from the face of the disk from which the alined ribs project with the straight portion of the forks extending in an oblique direction.

HARRY G. TRAVER.

REFERENCES CITED

The following references are of record in the file of this patent:

UNITED STATES PATENTS

| Number | Name | Date |
|---|---|---|
| 662,275 | Kirlin | Nov. 20, 1900 |
| 729,239 | Swart | May 26, 1903 |
| 849,386 | Grigg | Apr. 9, 1907 |
| 1,002,172 | Myers | Aug. 29, 1911 |
| 1,666,374 | Gatti | Apr. 17, 1928 |
| 1,744,597 | Vasconcellos | Jan. 21, 1930 |
| 2,196,857 | Frechtling et al. | Apr. 9, 1940 |